J. M. AARONS.
COATING FOR BOILER SETTINGS AND THE LIKE.
APPLICATION FILED FEB. 4, 1916.

1,310,591. Patented July 22, 1919.

Witnesses:
A. L. Lord.
D. Tozer.

Inventor.
Jacob M. Aarons
by B. W. Brockett
Atty.

UNITED STATES PATENT OFFICE.

JACOB M. AARONS, OF CLEVELAND, OHIO, ASSIGNOR TO THE EXCELO MANUFACTURING COMPANY, OF CLEVELAND, OHIO, A CORPORATION OF OHIO.

COATING FOR BOILER-SETTINGS AND THE LIKE.

1,310,591.   Specification of Letters Patent.   Patented July 22, 1919.

Application filed February 4, 1916. Serial No. 76,169.

*To all whom it may concern:*

Be it known that I, JACOB M. AARONS, a citizen of the United States, residing at Cleveland, in the county of Cuyahoga and State of Ohio, have invented certain new and useful Improvements in Coatings for Boiler-Settings and the like, of which the following is a specification.

The invention generally speaking relates to sealed porous structures and particularly to boiler settings.

More specifically the invention contemplates the use of brick work supplied with a primer coat forming a protecting coating for an outer shell or layer of a sealing material the two coats sealing the pores and any cracks which may be present.

The invention may be further briefly summarized as consisting in the subject matter set forth in the following description, drawings and claim.

Figure 1:
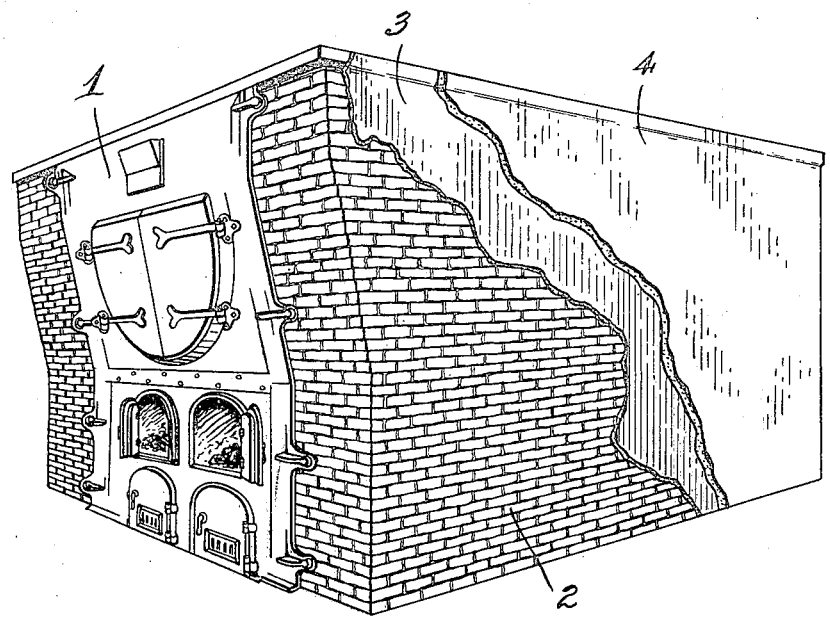
Figure 2:
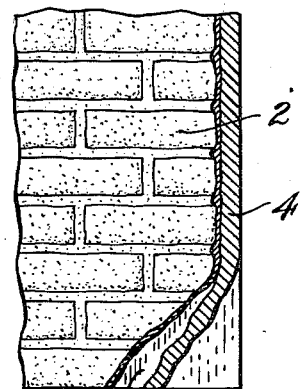

Referring to the drawings, Figure 1 is a perspective view of a boiler setting, and Fig. 2 is a view showing the several coats in section as applied to the brick work.

In the embodiment shown, 1 represents the boiler front of any preferred construction, and 2 a boiler setting which is of brick or similar material. Applied to the brick work is a primer coat 3 of a material which fills the pores and forms a protecting coat for the outer shell or cover 4. A material which is suitable for use as a primer coat comprises a composition made up of refined tar and nondrying oils. This material is brushed onto the surface until it is completely covered. Upon this coat is applied a relatively thick coating or shell of a composition such as asbestos fiber, gilsonite finely divided, pine pitch, and refined tar. When the setting is coated in this way the primer coat enters the pores of the brick work and operates to support the outer coating and at the same time its nondrying oil prevents the absorption by the brick work of any of the materials of the outer coat, the outer coat forming a seal and rendering the surface air tight.

The applicant is familiar with the use of outer coatings such as is set forth in the composition herein described on the outside of brick settings, but the use of this coat alone without a primer coat results in the absorption by the brick work of some of the materials of the outer coat causing it to dry out and peel off. By the use of the priming coat before stated, the pores of the brick work are filled, the priming coat adheres firmly and permanently to the setting, and the outer coat becomes permanently united with the priming coat and will not peel or flake off of the same. A boiler setting so coated has numerous advantages over settings as heretofore constructed in the art. The coating makes the setting entirely air proof. In other words, atmospheric air can not strike in through the setting to its interior surface, as a result of which the bad effects of expansion and contraction in the masonry are largely eliminated. If air can penetrate the same it is subjected to variation in temperature on both sides, on the inside to the variation of several hundred degrees in the temperature of the fire, and on the outside to a considerable variation in atmospheric temperature. The permanent coating provided by this invention keeps the outer temperature substantially uniform, so that the masonry must contend entirely with variations in temperature on the fire side. Experience has shown that a coating of this kind produces a marked saving in fuel and materially increases the efficiency of the boiler, so much so, indeed, that the economy in operation of the furnace more than offsets the cost of the coating.

Having described my invention, I claim:—

A boiler setting structure comprising courses of brick and mortar, a primer coat applied thereto to fill the pores, said primer coat containing a nondrying substance, and an outer seal applied to the primer coat and sealing the entire setting against air leakage.

In testimony whereof I affix my signature in presence of two witnesses as follows.

JACOB M. AARONS.

Witnesses:
G. O. FARQUHARSON,
D. TOZER.